(12) United States Patent
Landis et al.

(10) Patent No.: US 11,671,955 B2
(45) Date of Patent: Jun. 6, 2023

(54) COMMON PATHLOSS REFERENCE SIGNAL FOR SPATIAL DOMAIN MULTIPLEXING SHARING A COMMON ANTENNA PANEL

(71) Applicant: QUALCOMM INCORPORATED, San Diego, CA (US)

(72) Inventors: Shay Landis, Hod Hasharon (IL); Ran Berliner, Kfar-Aviv (IL); Yehonatan Dallal, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 17/199,140

(22) Filed: Mar. 11, 2021

(65) Prior Publication Data

US 2022/0295466 A1 Sep. 15, 2022

(51) Int. Cl.
*H04B 7/0452* (2017.01)
*H04W 72/044* (2023.01)
*H04W 52/14* (2009.01)
*H04W 72/23* (2023.01)

(52) U.S. Cl.
CPC ....... *H04W 72/046* (2013.01); *H04W 52/146* (2013.01); *H04W 72/23* (2023.01)

(58) Field of Classification Search
CPC ..... H04W 16/28; H04W 52/34; H04W 52/08; H04W 52/38; H04W 52/04; H04W 52/18; H04W 52/16; H04W 52/10; H04L 43/0829; H04B 7/0413; H04B 7/0452
See application file for complete search history.

(56) References Cited

U.S. PATENT DOCUMENTS

2021/0360631 A1* 11/2021 Cirik ................... H04W 72/042

* cited by examiner

*Primary Examiner* — Tu X Nguyen
(74) *Attorney, Agent, or Firm* — Haynes and Boone, LLP

(57) ABSTRACT

Wireless communications systems and methods related to reducing the signaling overhead for configuring a common reference signal used in performing coarse power control of multiple spatial domain multiplexing (SDM) uplink streams are provided. A base station may be in communication with a UE via multiple SDM streams directed from the same panel of the respective device. The base station may configure a common pathloss reference signal for the SDM streams of the same panel for the UE. This may include sending a list of possible pathloss reference signal configurations to the UE, and then identifying which configuration to use for the pathloss reference signal for the group of SDM streams. Once known, the UE may measure the reference signal for open loop power control. The BS may occasionally reconfigure the common reference signal for the grouped SDM streams.

14 Claims, 7 Drawing Sheets

COMMON PATHLOSS REFERENCE SIGNAL FOR SPATIAL DOMAIN MULTIPLEXING SHARING A COMMON ANTENNA PANEL

TECHNICAL FIELD

This application relates generally to wireless communication systems, and more particularly to configuring and/or using a common reference signal for multiple spatial domain multiplexing (SDM) uplink streams.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

As attention turns to using higher frequency bands (e.g., millimeter wave band and beyond) for mobile communication, devices may use beamforming techniques to more efficiently transmit and receive signals. At higher frequency bands, for example, the beams may become narrower to allow for sufficient coverage due to higher propagation losses. The use of narrow beams, with corresponding higher directivity, allows multiple beams to use spatial domain multiplexing (SDM) to transmit different streams of data concurrently at overlapping time and carrier frequencies.

As the number of concurrent SDM streams increases, however, the beam management overhead in signaling and complexity increases. Concurrently, the latency increases due to the increased management overhead. Such complexity, overhead, and latency is undesirable. Accordingly, more efficient methods of establishing and maintaining multiple SDM streams, including for UEs communicating via different SDM streams to a common panel of antennas at a shared BS is desirable.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes receiving, by a first wireless communications device from a second wireless communications device, a message comprising configuration information indicating a reference signal for a plurality of spatial domain multiplexing (SDM) uplink streams. The method further includes measuring, by the first wireless communications device, the reference signal from the second wireless communications device. The method further includes applying, by the first wireless communications device, a result from the measuring to each stream among the plurality of SDM uplink streams.

In an additional aspect of the disclosure, a method of wireless communication includes determining, by a first wireless communications device, a common reference signal for a plurality of spatial domain multiplexing (SDM) uplink streams. The method further includes transmitting, by the first wireless communications device to a second wireless communications device, a message comprising configuration information indicating the reference signal. The method further includes transmitting, by the first wireless communications device to the second wireless communications device, the reference signal.

In an additional aspect of the disclosure, a first wireless communications device includes a transceiver configured to receive, from a second wireless communications device, a message comprising configuration information indicating a reference signal for a plurality of spatial domain multiplexing (SDM) uplink streams. The transceiver is further configured to measure the reference signal from the second wireless communications device. The first wireless communications device further includes a processor configured to apply a result from the measuring to each stream among the plurality of SDM uplink streams.

In an additional aspect of the disclosure, a first wireless communications device includes a processor configured to determine a common reference signal for a plurality of spatial domain multiplexing (SDM) uplink streams. The first wireless communications device further includes a transceiver configured to transmit, to a second wireless communications device, a message comprising configuration information indicating the reference signal. The transceiver is further configured to transmit, to the second wireless communications device, the reference signal.

Other aspects, features, and embodiments of the present invention will become apparent to those of ordinary skill in the art, upon reviewing the following description of specific, exemplary aspects of the present invention in conjunction with the accompanying figures. While features of the present invention may be discussed relative to certain aspects and figures below, all aspects of the present invention can include one or more of the advantageous features discussed herein. In other words, while one or more aspects may be discussed as having certain advantageous features, one or more of such features may also be used in accordance with the various aspects of the invention discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
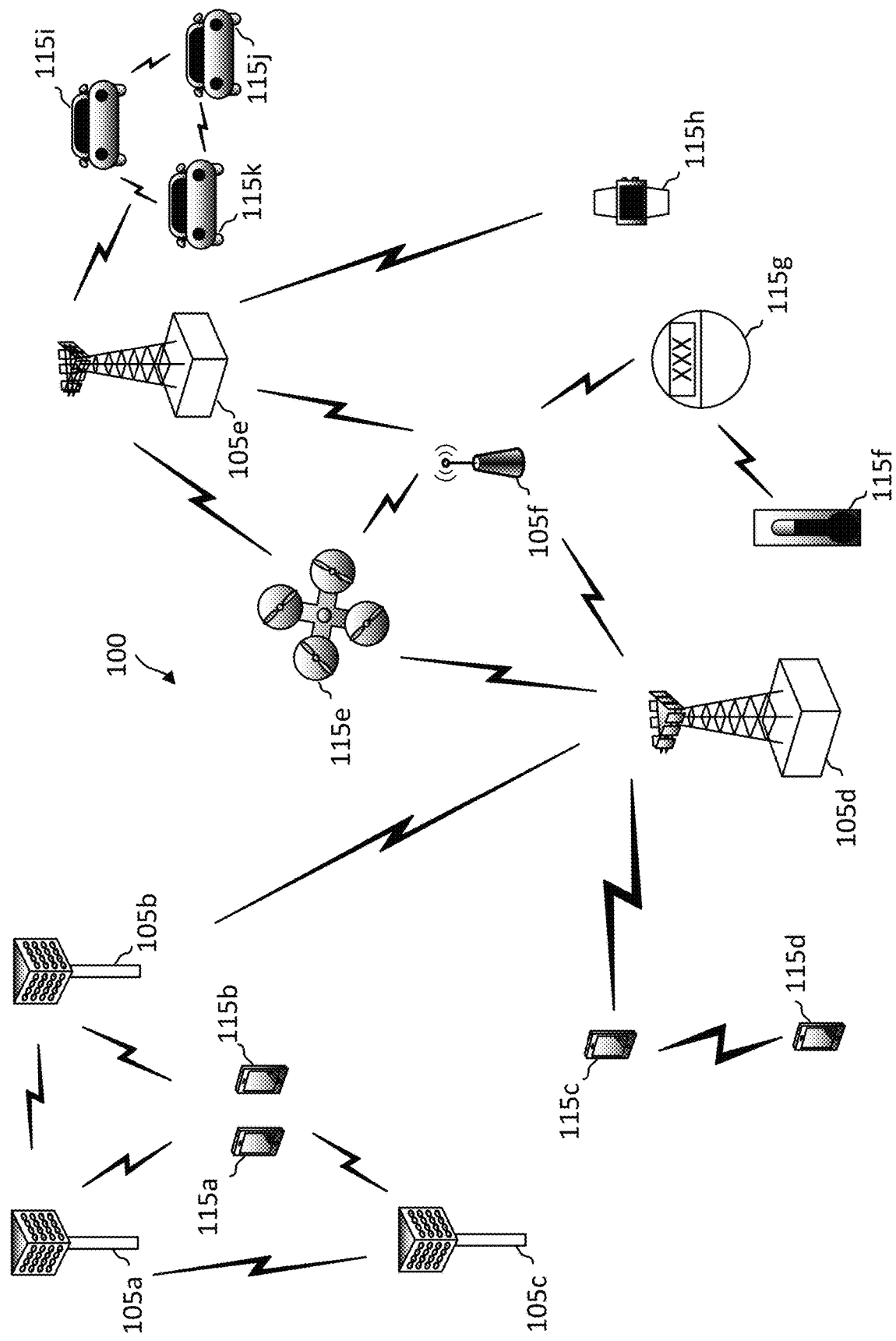
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), spatial domain multiplexing (SDM), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Wireless communications at higher frequencies, such as mmWave frequency ranges, may experience a higher path-loss compared to lower frequency bands. To overcome the higher path-loss, BSs and UEs may use beamforming techniques to form directional beams for communications. For instance, a BS and/or a UE may be equipped with one or more antenna panels or antenna arrays with antenna elements that can be configured to focus transmit signal energy and/or receive signal energy in a certain spatial direction and/or within a certain spatial angular sector or width. A beam used for such wireless communications may be referred to as an active beam, a best beam, or a serving beam. The active beam may initially be selected from reference beams and then refined over time.

To overcome the higher path-loss, networks operating over the sub-THz to THz frequency ranges may deploy BSs with a number of transmission-reception points (TRPs) and/or in smaller areas to reduce the distance or range between a BS and a UE or between a TRP and a UE. In this regard, a BS may include multiple TRPs located at different geographical areas, where the TRPs may operate as radio-heads providing radio frontend (RF) functionalities for over-the-air communications. In some scenarios, certain BS functionalities (e.g., protocol stack related functions) may also be distributed to the TRPs. The TRPs may be located closer to certain UEs, and the BS may communicate with the UEs via the TRPs to reduce the communication range. Additionally, the BSs and/or TRPs may communicate with the UEs using narrower or more focused beams to combat the higher path-loss. In such deployment scenarios, it is possible to take further advantage of the vast number of TRPs and the narrower beams by configuring multiple TRPs to communicate different data streams with the UEs in a spatial domain multiplexing (SDM) configuration to provide further increase in data rates. Different TRPs may be located at different spatial directions from the UE. As such, the UE may use different beams (directed in different beam directions) to communicate with different TRPs (and/or to different beams of the same TRP, using the same or multiple panels on the same TRP). The different beam directions along with the narrower beams can enable simultaneous transmission of different data streams from different TRPs (or from the same TRP) to the UE, and thereby increasing data throughputs.

As the number of SDM streams increases, so does the signaling overhead with corresponding impacts on complexity, latency, and efficiency. Configuring which reference signal is used for power control for each stream, for example, increases the overall signaling overhead between the BS (via one or more TRPs, for example) and the UE. While the pathloss of each SDM beam is distinct from the others for communication with a given UE, there may be some commonalities among multiple beams. For instance, when a UE moves about, there will be some coarse changes that are common between the moving UE and the different beams of the same TRP. By taking advantage of commonalities, the configuration of one or more pathloss reference signals for the SDM streams may be performed more efficiently.

The present application describes mechanisms for performing improved SDM uplink stream management. A base station which is in communication with a UE via multiple SDM streams may transmit to the UE a message or series of messages to create a list of reference signals on the UE (e.g., of possible PUSCH-PathlossReferenceRS for UL SDM streams). In some aspects, the message may be transmitted as part of a radio resource control (RRC) message. The BS may also indicate to the UE via a message to form a group comprising all or a subset of the SDM uplink streams. By joining the streams into a group, the BS may configure certain parameters which affect the entire group, rather than configuring the parameter(s) individually for each stream.

After configuring the UE with the list of available reference signals, the BS may send a message to the UE indicating which of the reference signals on the list of reference signals is to be used as a reference signal for power control of the SDM uplink streams that are in the indicated group. This may be referred to herein as a common PathlossReferenceRS or simply common reference signal herein. In some examples, the UE may have previously made a recommendation to the BS of which reference to use, which the BS may determine to accept or not, and in other examples the BS may make its own determination. This message indicating which reference signal to use from a list may be sent as part of a downlink control information (DCI) message, for example. The messages from the BS may be communicated in a variety of ways, for example on all, a subset of, or one of the SDM DL streams corresponding to the uplink SDM streams. Alternatively, the BS may send the message by a different stream or technology that is not associated with the stream being configured. However sent, once the UE knows which reference signal it is configured to use from among the list of those possible, the UE may measure the reference signal (i.e., the common PathlossReferenceRS indicated from the list) for open loop power control for the uplink SDM streams. Closed loop power control (e.g., fine resolution) may be configured per UL SDM stream.

In some embodiments, the BS may reconfigure the common reference signal for the grouped SDM streams. The BS may communicate to the UE to reconfigure the common reference signal for a number of reasons, including if the TRP that a UE is communicating with changes, or when the UE moves in relation to the BS/TRP for existing UL SDM streams, or when the BS determines to change what is used as the reference signal (e.g., switching between using a synchronization signal block (SSB) or a CSI-RS), or when there is a change in some channel characteristic (such as one of the beams being received at a much lower power than the rest of the beams in the group, as might occur when a change in the environment occurs that affects scattering of the stream(s)).

Aspects of the present disclosure provide several benefits. For example, in situations where there are multiple beams between a BS and a UE, such as analog directional beams, with corresponding SDM streams, a BS configuring a reference signal for the multiple UL SDM streams together as a group (e.g., a group of streams using the same or close panels) may use less overhead than sending individual configuration messages for each of the streams. Latency may also be improved by reducing the overhead associated with configuring new SDM uplink streams, or modifying existing SDM uplink streams. Therefore, a BS/UE pair utilizing aspects of the invention may achieve higher data rates than otherwise. In addition, in higher frequency bands (e.g., mmWave and above), where concurrent SDM streams are expected, such configuration overhead reduction and latency improvement, as realized according to aspects of the present disclosure, is significant.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

One or more of the BSs 105 may have one or more transmission-reception points (TRPs). This may be done to reduce the distance or range between a BS 105 and a UE 115 or between a TRP and a UE 115. A given BS 105 may, for example, include multiple TRPs located at different geographical areas, where the TRPs may operate as radio-heads providing radio frontend (RF) functionalities for over-the-air communications. In some scenarios, certain BS 105 functionalities (e.g., protocol stack related functions) may also be distributed to the TRPs. Thus, in the example of FIG. 1, some of the BSs 105 may have one or more TRPs (not illustrated), or be themselves examples of TRPs for a remote BS.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may utilize spatial domain multiplexed (SDM) signals for communication between devices. By utilizing SDM, communication between two devices in the network 100 may be performed across multiple streams at the same time and frequencies by using spatially differentiated beam paths. To achieve spatially differentiated beams, a UE 115 and/or BS 105 may use a panel of antennas in an array, lens antennas, and/or Butler matrices (to name a few examples). Using these techniques, relatively narrow beams may be formed, which may be narrowed in one or both of elevation and azimuth. A UE 115 may communicate with a BS 105 using two or more SDM uplink streams, each of which is associated with a different beam path. For example, one of the beams may travel along a line-of-sight propagation path, while a separate SDM uplink stream takes a path which includes a reflection off of a reflective object. Each of the beams may carry a separate SDM data stream (on uplink and/or downlink), which may utilize the same frequency and time resources as another. A BS 105 may send one or more control messages to a UE 115 in order to configure and manage the beams, for example by indicating a reference signal associated with the beams. This may be, for example, a message to configure a common reference signal, such as a common PathlossReferenceRS as discussed further herein.

A given UE 115 may be associated with different groups, such that the UE 115 may receive configuration information for more than one common reference signal. For example, UE 115*a*, as illustrated in FIG. 1, communicates with BS 105*a* as well as BS 105*c*. In some examples, each BS 105 (105*a* and 105*c* in this simple example) may have multiple concurrent SDM streams between UE 115*a* and BS 105*a*, and likewise between UE 115*a* and BS 105*c*. The concurrent SDM streams between UE 115*a* and BS 105*a* may be between common panels at the respective devices, and likewise between UE 115*a* and BS 105*c*. Accordingly, the UE 115*a* may receive a configuration message for a common reference signal for the concurrent SDM streams to BS 105*a*, and another configuration message for another common reference signal for the concurrent SDM streams to BS 105*c*. This, instead of a different configuration message for each individual SDM stream for pathloss reference signals, reduces signaling overhead and improves latency as further discussed below.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a backoff indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission. The combined random access preamble and connection request in the two-step random access procedure may be referred to as a message A (MSG A). The combined random access response and connection response in the two-step random access procedure may be referred to as a message B (MSG B).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using hybrid automatic repeat request (HARQ) techniques to improve communication reliability, for example, to provide a ultra-reliable low-latency communication (URLLC) service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 decodes the DL data packet successfully, the UE 115 may transmit a HARQ acknowledgement (ACK) to the BS 105. Conversely, if the UE 115 fails to decode the DL transmission successfully, the UE 115 may transmit a HARQ negative-acknowledgement (NACK) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple bandwidth parts (BWPs) (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

Figure 2:
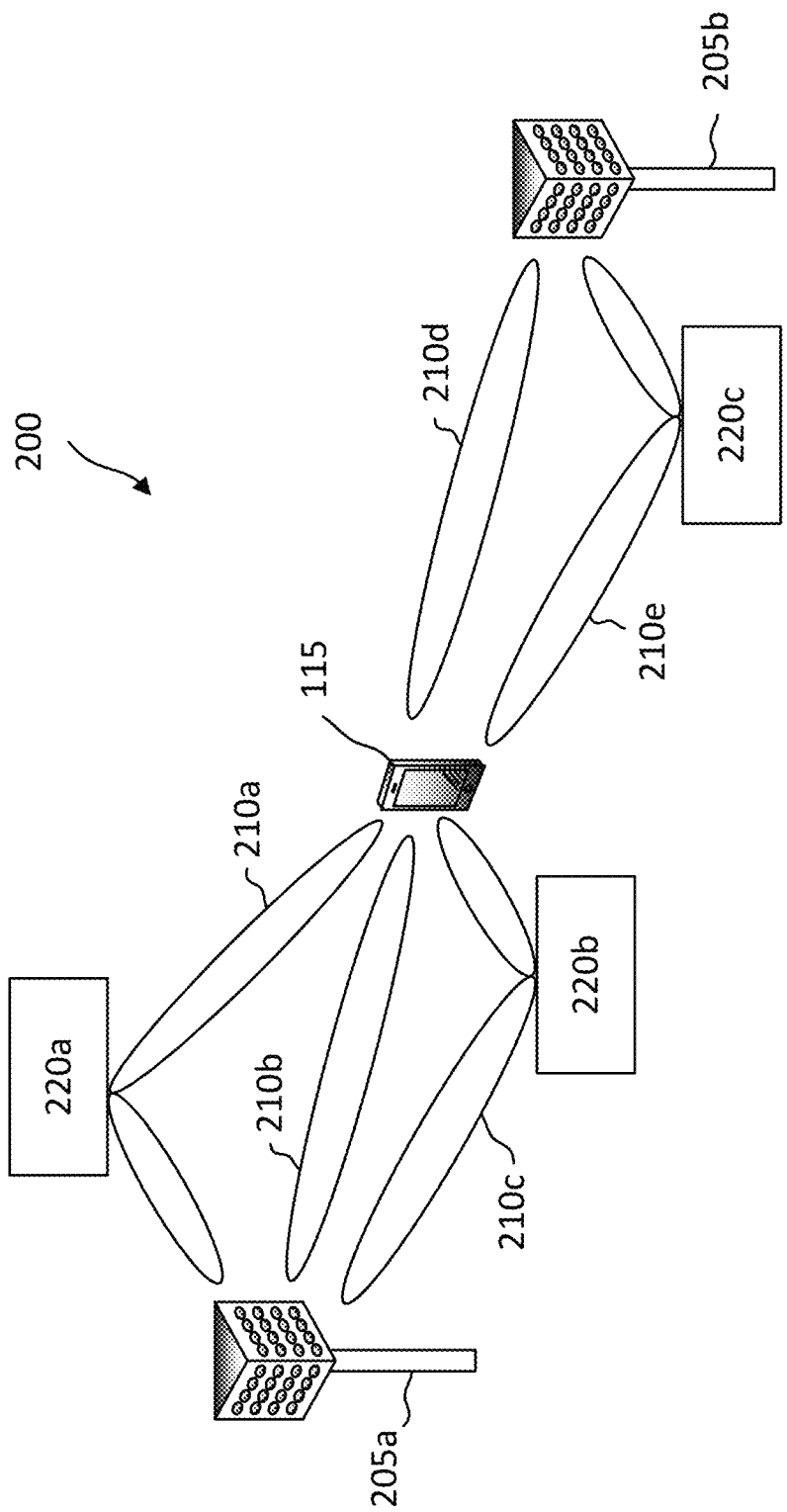
FIG. 2 illustrates an exemplary wireless communication scheme that utilizes spatial domain multiplexed beams according to some aspects of the present disclosure.

FIG. 2 illustrates a wireless communication network 200 that supports directional beamforming according to some aspects of the present disclosure. The network 200 may correspond to a portion of the network 100. FIG. 2 illustrates two TRPs 205 (shown as 205a and 205b) serving one UE 115 for simplicity of illustration and discussion, though it will be recognized that aspects of the present disclosure may scale to any suitable number of UEs 115 and/or TRPs 205. In some instances, the TRPs 205 may also be referred to as radio heads or remote radio heads. The TRPs 205 may implement at least some RF functionalities for over-the-air communications with the UE 115. In some instances, a BS (not shown) may also distribute some other functionalities such as baseband processing and/or protocol stack processing to the TRPs 205. In some instances, at least one of the TRPs 205 can be co-located with a BS (and, generally, also be referred to as a BS). In some instances, both TRPs 205 can be located remotely from the BS. In some exemplary embodiments according to the present disclosure, the TRPs 205 and the UE 115 may communicate with each other over a high-frequency band, such as a mmWave frequency range or a sub-THz range, and/or up to a THz range.

In FIG. 2, the TRPs 205 and the UE 115 may use beamforming techniques to generate transmit and/or reception beams to/from each other. In this regard, the UE 115 may generate a set of transmission beams 210 (shown as 210a, 210b, 210c, 210d, and 210e) in a set of beam directions. Each of the beams 210a-210e may have a certain beam width covering a certain spatial angular sector. Each beam may be used, for example, for a stream from one device to another. For example, the TRP 205a may transmit a corresponding downlink stream via each of beams 210a, 210b, and 210c to UE 115, and likewise TRP 205b a corresponding stream via each of beams 210d and 210e. The UE 115 may transmit, in turn, corresponding uplink streams via the beams 210 noted above with the TRPs 205a, 205b respectively. In the discussion below regarding the configuration of pathloss reference signals for SDM uplink streams, each uplink stream may utilize a different beam such as those illustrated in FIG. 2. As such, the configuration of a pathloss reference signal for a stream relates to a configuration of which reference signal to use for open loop power control of an uplink stream for the associated beam. For simplicity, the discussion below typically references SDM uplink streams, without explicitly discussing the beams.

As illustrated, beam 210b travels along a line-of-sight (LOS) propagation path between UE 115 and TRP 205a. Similarly, beam 210d travels in a LOS propagation path between UE 115 and TRP 205b. The remainder of the beams as shown take paths which include a reflection. Beam 210a is reflected off of an exemplary reflective object 220a, beam 210c is reflected off of an exemplary reflective object 220b, and beam 210e is reflected off of an exemplary reflective object 220c. These beam paths are exemplary to show the spatial and path diversity that is possible between a UE and a TRP, and the specific paths that beams follow may vary in a number of ways, including differences in the polarity of signals. Although FIG. 2 illustrates three beams between UE 115 and TRP 205a, and two beams between UE 115 and TRP 205b, in other examples there may be more or fewer beams between each pair.

While taking different paths between UE 115 and TRPs 205, some beams may take paths which are similar enough to each other in some respect such that certain configuration parameters may be shared between the beams. For example, beam paths 210d and 210e as illustrated will each become longer as UE 115 moves away from TRP 205b, and shorter as UE 115 moves towards TRP 205b. Continuing with that example, beam paths 210a-210c may each become shorter as UE 115 moves towards TRP 205a (i.e., also away from TRP 205b), and shorter as UE 115 moves away from TRP 205a (i.e., towards TRP 205b).

In some aspects, each of the TRP 205a, TRP 205b, and the UE 115 may have one or more antenna panels or one or more antenna arrays each comprising a plurality of antenna elements. The antenna elements can be individually controlled to adjust the gain and/or phase such that an antenna array or an antenna panel can be configured to focus a transmit signal in a certain beam direction and/or to focus in a certain beam direction for receiving a signal. The TRP 205a may communicate multiple beams directed generally towards the UE 115 in similar a DL direction. Similarly, TRP 205b may communicate multiple beams directed generally towards the UE 115 in a similar DL direction. In either example, the multiple beams may be from a same panel of the given TRP.

Figure 3:
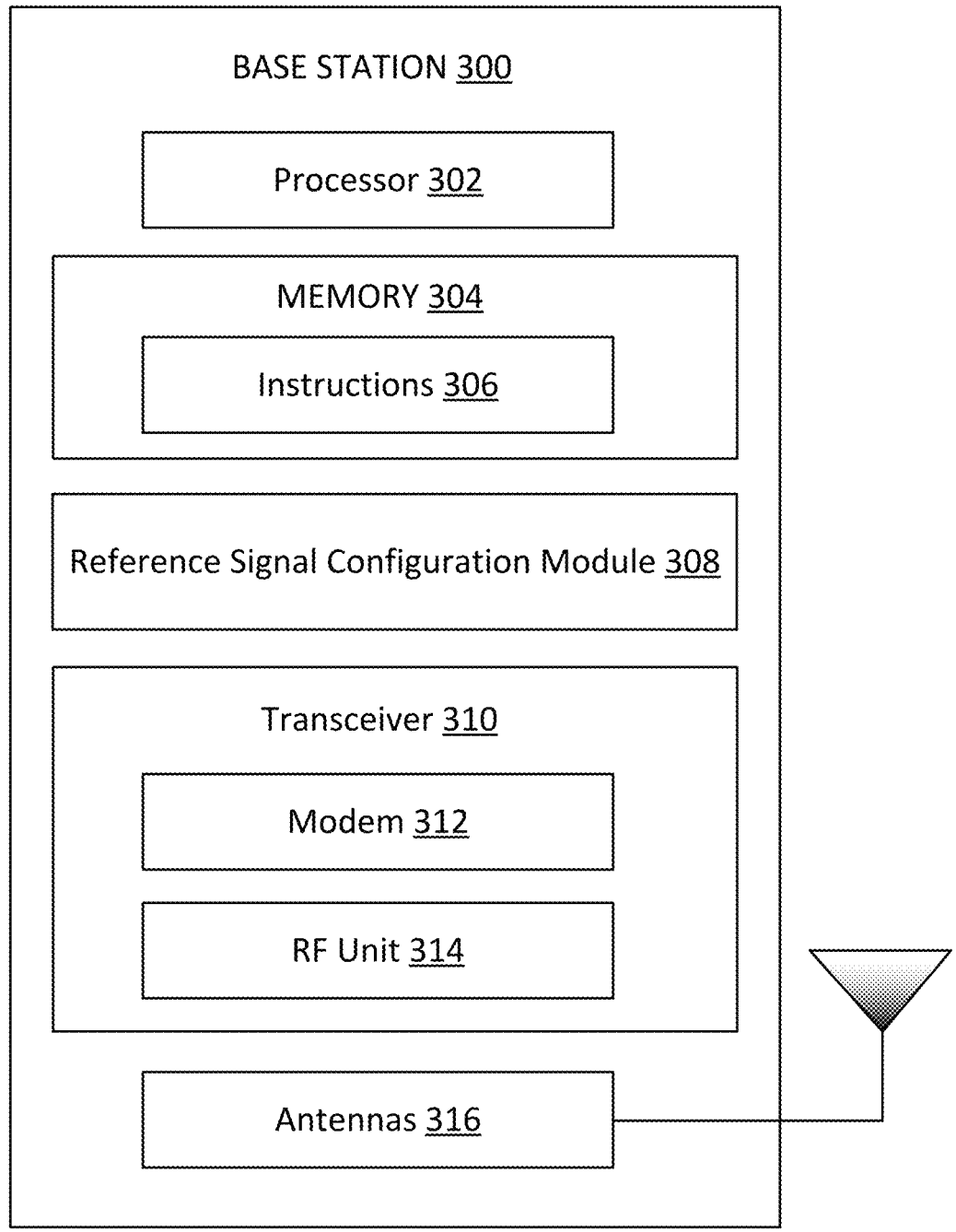
FIG. 3 is a block diagram of an exemplary base station (BS) according to some aspects of the present disclosure.

FIG. 3 is a block diagram of an exemplary BS 300 according to some aspects of the present disclosure. In some instances, the BS 300 may be a BS 105 in the network 100 as discussed above in FIG. 1. In some other instances, the BS 300 may be a TRP 205a and/or TRP 205b in the network 200 as discussed above in FIG. 2. As explained above, a TRP may implement at least RF functionalities, but may also implement some baseband processing and/or protocol stack layer processing similar to a BS. As shown, the BS 300 may include a processor 302, a memory 304, a reference signal configuration module 308, a transceiver 310 including a modem subsystem 312 and a RF unit 314, and one or more antennas 316. These elements may be coupled with one another. The term "coupled" may refer to directly or indirectly coupled or connected to one or more intervening elements. For instance, these elements may be in direct or indirect communication with each other, for example via one or more buses.

The processor 302 may have various features as a specific-type processor. For example, these may include a CPU, a DSP, an ASIC, a controller, a FPGA device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 304 may include a non-transitory computer-readable medium. The memory 304 may store instructions 306. The instructions 306 may include instructions that, when executed by the processor 302, cause the processor 302 to perform operations described herein, for example, aspects of FIGS. 1-2 and 5-7. Instructions 306 may also be referred to as program code. The program code may be for causing a wireless communication device to perform these operations, for example by causing one or more processors (such as processor 302) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The reference signal configuration module 308 may be implemented via hardware, software, or combinations thereof. For example, the reference signal configuration module 308 may be implemented as a processor, circuit, and/or instructions 306 stored in the memory 304 and executed by the processor 302. In some examples, the reference signal configuration module 308 can be integrated within the modem subsystem 312. For example, the reference signal configuration module 308 can be implemented by a combination of software components (e.g., executed by a DSP or a general processor) and hardware components (e.g., logic gates and circuitry) within the modem subsystem 312.

The reference signal configuration module 308 may communicate with various components of the BS 300 to perform various aspects of the present disclosure, for example, aspects of FIGS. 1-2 and 5-7. In some aspects, the reference signal configuration module 308 is configured to determine a common reference signal to be sent to a UE for use with a plurality of spatial domain multiplexing (SDM) uplink streams. The reference signal configuration module 308 is further configured to transmit, to a UE, a message comprising configuration information indicating the reference signal, and transmit the reference signal to the UE. In some aspects, reference signal may be a common PathlossReferenceRS.

The message comprising configuration information may in some aspects be comprised of multiple messages. For example, a first message may indicate a list of reference signals which may be selected from. The list of reference signals may also be assembled by adding or removing reference signals one at a time or more than one at a time from the list over time by sending multiple messages to the UE. The message comprising a list of reference signals may sent as part of a radio resource control (RRC) message. Further, a message may be sent indicating which of the reference signals in the list should be used by the UE for the plurality of SDM uplink streams (e.g., the plurality of SDM uplink streams that are transmitted via beams between the same panel of the UE and received by the same panel of the BS). The message indicating which reference signal to use from the list may be a part of a downlink control information (DCI) message.

In some aspects, the reference signal configuration module 308 may configure the UE 115 with a group of SDM uplink streams. The reference signal configuration module 308 may send configuration information to create one group, or multiple groups, each with a different set of SDM uplink streams. The grouping of the SDM uplink streams may facilitate configuring reference signals which are common among the SDM uplink streams in each respective group. As a result, a given UE 115 may be configured with one or more groups of different SDM uplink streams. With such grouping, the reference signal configuration module 308 may transmit a further configuration message, such as via DCI messaging, instructing the UE 115 which PathlossReferenceRS to use for the SDM uplink streams in a corresponding group. This may be repeated for each of any other grouped SDM uplink streams at the given UE 115.

In some aspects, the reference signal configuration module 308 is configured to occasionally change which reference signal is used by each configured group. This change may be by a message for the group, as opposed to individual messages for each of the SDM uplink streams within the group. There are a number of scenarios in which a reference signal configuration module 308 may determine that a change in a Common PathlossReferenceRS is warranted and/or desirable. For example, a change may be warranted when the BS 300 has configured a new preferable reference signal (e.g. CSI-RS instead of SSB). Another scenario may be when the UE is changing which cell it is connected to. Another reason the beam module 308 may change the indicated reference signal relates to when there is some change in one or more signal paths such that the reference signal no longer provides a good enough estimate of the changed signal paths. For example if an object which was reflecting the beam for one of the SDM uplink streams, such as reflective object 220a, moved, this might cause enough change in the signal path (if it is still a viable path) that a different reference signal may be better used for coarse power correction.

As shown, the transceiver 310 may include the modem subsystem 312 and the RF unit 314. The transceiver 310 can be configured to communicate bi-directionally with other devices, such as the UEs 115 and/or another core network element. The modem subsystem 312 may be configured to modulate and/or encode data according to a MCS, e.g., a LDPC coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data (e.g., RRC configuration, CSI-RS resource configuration, CSI-RS report configuration, CSI-RSs, SSB beams) from the modem subsystem 312 (on outbound transmissions) or of transmissions originating from another source such as a UE 115. The RF unit 314 may be further configured to perform analog beamforming in conjunction with the digital beamforming. Although shown as integrated together in transceiver 310, the modem subsystem 312 and/or the RF unit 314 may be separate devices that are coupled together at the BS 105 to enable the BS 105 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices and provide the received data messages for processing and/or demodulation at the transceiver 310. The transceiver 310 may provide the demodulated and decoded data (e.g., messages indicating reference signals) to the reference signal configuration module 308 for processing. The antennas 316 may include multiple antennas of similar or different designs in order to sustain multiple transmission links. In some aspects, the antennas 316 may in the form of one or more antenna panels or one or more antenna arrays each including a plurality of antenna element that can be selectively configured with different gains and/or phases to generate a beam for transmission and/or reception.

Figure 4:
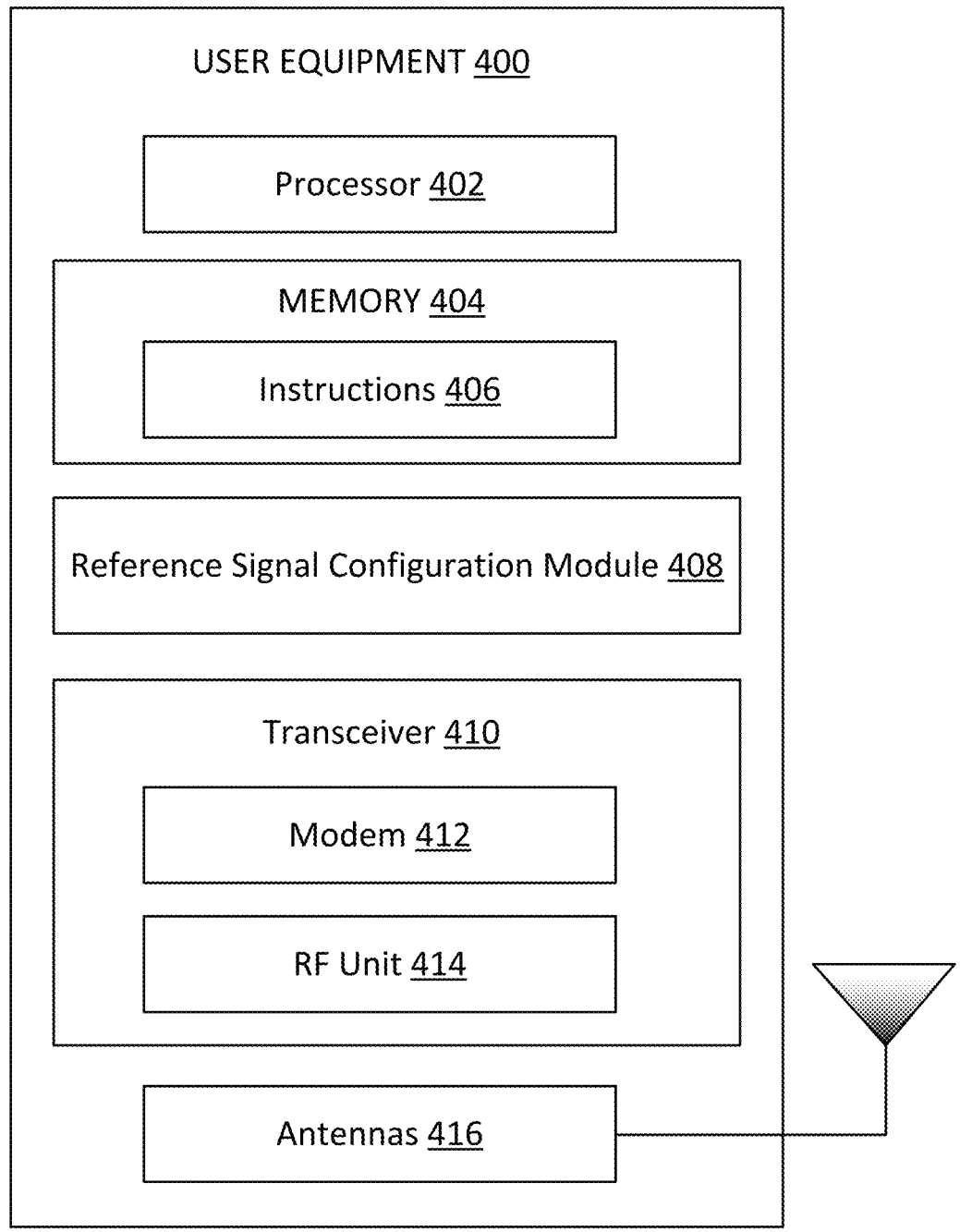
FIG. 4 is a block diagram of an exemplary user equipment (UE) according to some aspects of the present disclosure.

FIG. 4 is a block diagram of an exemplary UE 400 according to some aspects of the present disclosure. In some instances, the UE 400 may be a UE 115 as discussed above with respect to FIGS. 1 and 2. As shown, the UE 400 may include a processor 402, a memory 404, a reference signal configuration module 408, a transceiver 410 including a modem subsystem 412 and a radio frequency (RF) unit 414, and one or more antennas 416. These elements may be coupled with one another. The term "coupled" may refer to directly or indirectly coupled or connected to one or more intervening elements. For instance, these elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with aspects of the present disclosure, for example, aspects of FIGS. 1-2 and 5-7. Instructions 406 may also be referred to as program code, which may be interpreted broadly to include any type of computer-readable statement(s) as discussed above with respect to FIG. 3.

The reference signal configuration module 408 may be implemented via hardware, software, or combinations thereof. For example, the reference signal configuration module 408 may be implemented as a processor, circuit, and/or instructions 406 stored in the memory 404 and executed by the processor 402. In some examples, the reference signal configuration module 408 can be integrated within the modem subsystem 412. For example, the reference signal configuration module 408 can be implemented by a combination of software components (e.g., executed by a DSP or a general processor) and hardware components (e.g., logic gates and circuitry) within the modem subsystem 412.

The reference signal configuration module 408 may communicate with various components of the UE 400 to perform aspects of the present disclosure, for example, aspects of FIGS. 1-2 and 5-7. In some aspects, the reference signal configuration module 408 is configured to receive, from a BS, a message comprising configuration information for a reference signal (e.g., a common PathlossReferenceRS) for a plurality of spatial domain multiplexing (SDM) uplink streams. The reference signal configuration module 408 is further configured to cooperate with other aspects of the UE 400 to measure the reference signal(s) accordingly configured via the configuration information previously received from the BS 300. The UE 400 may also, such as via the reference signal configuration module 408, apply the result from the measurement to each stream among the plurality of SDM uplink streams for open loop power control on the uplink.

In some aspects the configuration may be performed by a number of messages, as discussed above with respect to FIG. 3. For example, the reference signal configuration module 408 may receive a first radio resource control (RRC) message containing a list of reference signals. The list of reference signals may also be formed over multiple RRC messages by adding or removing signals to and from the list individually. A separate message may be used to indicate which of the reference signals on the list is to be used by the plurality of SDM uplink streams. As a result, the reference signal to use may be configured for several SDM uplink streams via a common configuration message, thereby reducing signaling overhead.

The indicated reference signals (e.g., as identified by the separate message, such as a DCI message that identifies a reference signal from the RRC-configured list) may be used by the UE 400 to perform coarse power adjustment of the SDM uplink streams. For example, if the UE 400 is in a configuration such as UE 115 in FIG. 2, and the UE 400 moves away from TRP 205a, then the reference signal measurement will change accordingly, which the UE 400 may use to adjust the signal power for the beams associated with the SDM uplink streams.

In some aspects, the reference signal configuration module 408 may be configured to receive a message from the BS 105 creating one or more groups of SDM uplink streams. The grouping of the SDM uplink streams facilitates configuring reference signals which are common among the SDM uplink streams in each respective group. The grouping of the SDM uplink streams additionally allows for the reference signal configuration module 408 to receive messages regarding the entire group, such as changing which of the reference signals on the list of reference signals is selected for power adjustment. This may occur when the BS 105 determines that a change would be beneficial as described above with reference to BS 300 in FIG. 3.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404 and/or the beam module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., UE capability report, beam reports) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may include one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., Common PathlossReferenceRS configuration, and/or a pathlossReferenceRS upon receipt) to the reference signal configuration module 408 for processing. The antennas 416 may include multiple antennas of similar or different designs in order to sustain multiple transmission links. The RF unit 414 may configure the antennas 416. In some aspects, the antennas 416 may in the form of one or more antenna panels or one or more antenna arrays each including a plurality of antenna element that can be selectively configured with different gains and/or phases to generate a beam for transmission and/or reception.

Figure 5:
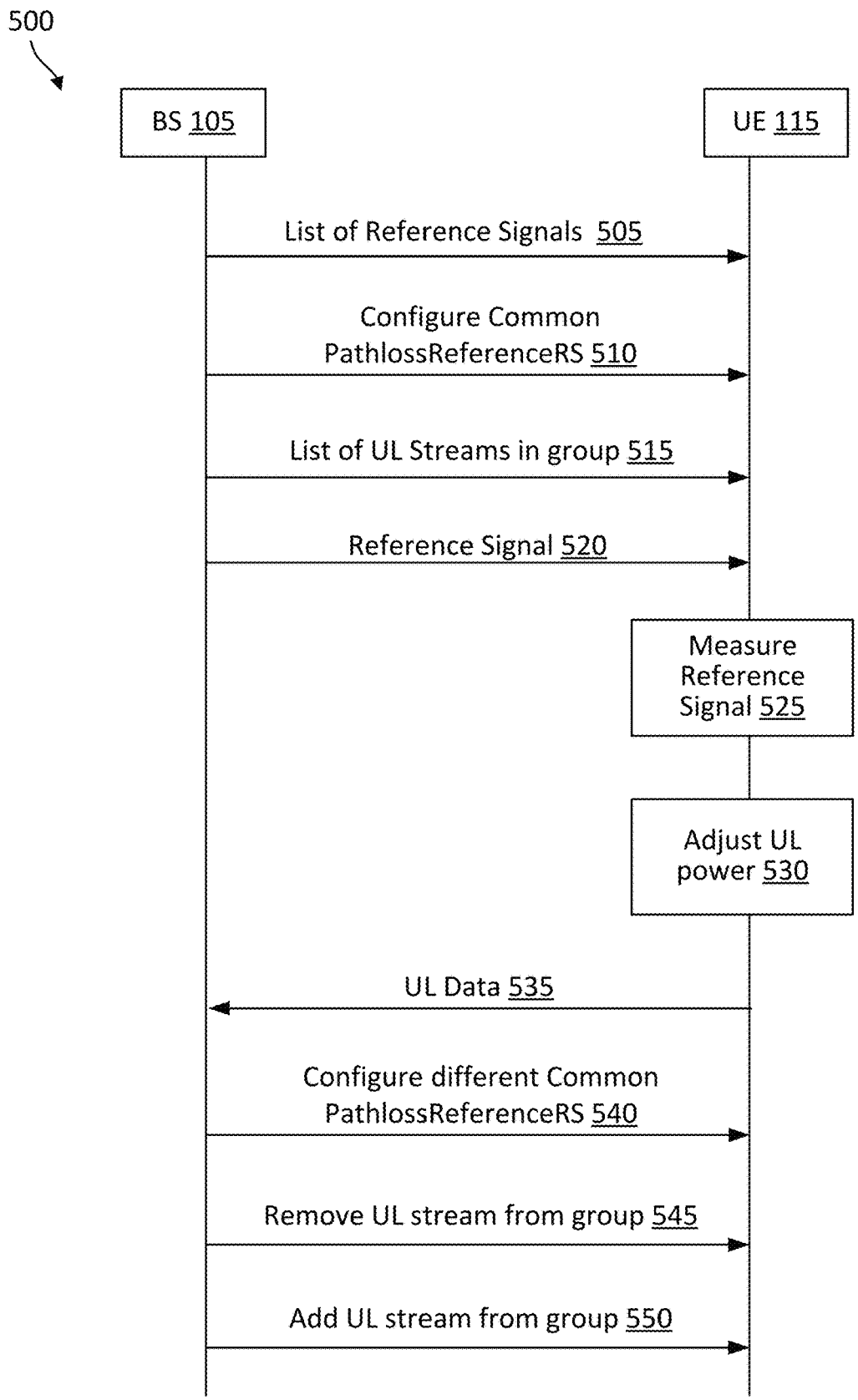
FIG. 5 illustrates an exemplary protocol diagram according to some aspects of the present disclosure.

FIG. 5 is a sequence diagram illustrating a communication protocol diagram 500 for configuring pathlossReferenceRS for SDM streams according to some aspects of the present disclosure. Aspects of the protocol diagram 500 may be performed by wireless networks, such as the networks 100 and/or 200 communicating over a high-frequency band, such as a mmWave band or a sub-THz to THz band. In this regard, a BS 105 and UE 115 may perform functions of the communication protocol diagram 500. In some instances, the BS 105 may utilize TRPs (e.g., the TRPs 205) to communicate with the UE 115. For simplicity of illustration and discussion, FIG. 5 is described from the perspective of a single TRP co-located with the BS 105 or at a remote location from the BS 105. However, similar communications may also occur for other TRPs that are in communication with the BS 105, at the same or different times. In some aspects, the UE 115 may be in a connected mode (e.g., an RRC connected state). In some aspects, the BS 105 may utilize one or more components, such as the processor 302, the memory 304, the reference signal configuration module 308, the transceiver 310, the modem 312, and the one or more antennas 316 shown in FIG. 3, and the UE 115 may utilize one or more components, such as the processor 402, the memory 404, the reference signal configuration module 408, the transceiver 410, the modem 412, and the one or more antennas 416 shown in FIG. 4. As illustrated, the method 500 includes a number of enumerated actions, but aspects of the FIG. 5 may include additional actions before, after, and in between the enumerated actions. In some aspects, one or more of the enumerated actions may be omitted or performed in a different order.

At action 505, the BS 105 may transmit a list of reference signals to the UE 115. The list of reference signals may be transmitted as part of an RRC message. The list of reference signals may also be communicated over a series of messages, adding and/or removing reference signals from the list as determined by the BS 105. This list of reference signals may be, for example, a list of possible PathlossReferenceRS from which some will be used in transmission on the downlink for the UE 115 to measure and use for open loop power control (as one exemplary use).

At action 510, the BS 105 may send a configuration to the UE 115 for a Common PathlossReferenceRS to use from those in the list received at action 505. This may be a bit or combination of bits operating as an index into the list of reference signals, or some other parameter that the UE 115 uses to select one of the reference signals from the list to be used by a plurality of SDM uplink streams (e.g., the SDM uplink streams between a same BS 105 panel and a same UE 115 panel).

At action 515, the BS 105 may transmit a message or series of messages defining a group of uplink streams. In some aspects, the UE 115 may be configured with a structure which defines the Common PathlossReferenceRS, and the group of uplink streams is within that structure. Alternatively, the UE 115 may be configured with a structure that defines the group of SDM uplink streams, and the Common PathlossReferenceRS is included within that structure. Accordingly, the order of the configuration of the list of reference signals, indication of the Common PathlossReferenceRS, and the configuration of the groups of SDM uplink streams may occur in a variety of ways as discussed in this disclosure.

In some aspects, the BS 105 may configure a group of streams in action 515, without configuring a list of reference signals or indicating a PathlossReferenceRS as in actions 505 and 510. In that case, the UE 115 may assume a default PathlossReferenceRS for the streams in the defined group. If the BS 105 configures neither a PathlossReferenceRS nor a group of streams (as in action 515), the UE 115 may assume a respective default PathlossReferenceRS for each individual stream.

At action 520, the BS may transmit the indicated reference signal, the common PathlossReferenceRS for example, to the UE 115. Other reference signals may be transmitted by the BS either simultaneously or at other times, but the UE 115 is configured to utilize the Common PathlossReferenceRS reference signal for each of the uplink beams identified at action 505 or action 510, such as for each reference signal identified as part of the same group.

At action 525, the UE 115 may measure the transmitted reference signal that was received at action 520. The UE 115 may use this measurement to make a coarse determination of how to adjust the power of the SDM uplink streams for open loop power control.

At action 530, the UE 115 may adjust the uplink power of the SDM uplink streams sharing the common reference signal according to the measurement performed at action 525. As this open loop power control captures common coarse changes due to UE 115 movement (or other environment change(s)), further variation/fine resolution control may occur via closed loop power control (which may be on a per-stream basis as opposed to the grouped basis per panel between UE and BS with the open loop power control according to embodiments of the present disclosure).

At action 535, the UE 115 may transmit uplink data to the BS 105. This uplink data is transmitted at a power as determined and implemented by the UE 115 (such as by reference signal configuration module 408 of FIG. 4) according to the reference signal measurement from action 525 and action 530, respectively.

Actions 520-535 may repeat over a period of time without the configuration of the common reference signal changing. However, if the BS 105 determines to reconfigure the common reference signal, additional actions may occur in FIG. 5. Reasons for reconfiguration may include the BS 105 (and/or TRP) that a UE 115 is communicating with changing, or when the UE 115 moves in relation to the BS/TRP for existing UL SDM streams, or when the BS determines to change what is used as the reference signal (e.g., switching between using a synchronization signal block (SSB) or a CSI-RS), or when there is a change in some channel characteristic (such as one of the beams being received at a much lower power than the rest of the beams in the group, as might occur when a change in the environment occurs that affects scattering of the stream(s)).

At action 540, the BS 105 may configure a different reference signal (e.g., Common PathlossReferenceRS) for the UE 115 to use in open loop power control. This reconfiguration of the common reference signal may include adding or removing reference signals from the list of reference signals (e.g., the list configured at action 505), in addition to a change in the indication of which of the reference signals in the list is to be used. The change in the Common PathlossReferenceRS may be peformed periodically, or only when determined to be necessary by the BS 105. Additionally, the UE 115 may indicate to the BS 105 a requested Common PathlossReferenceRS, which the BS 105 may or may not determine to use as requested.

Other exemplary actions may be taken in response to changes in the environment. For example, at action 545, the BS 105 may transmit a message to the UE 115 to remove an uplink stream from the group. This may be done for a variety of reasons, e.g. one of the streams has a channel which has degraded to the point that it is no longer reliable. The removed uplink stream may be unused, or may be added to another group either in the same message or through a separate message from the BS 105. Accordingly, action 545 may be optional.

At action 550, the BS 105 may add an uplink stream to the group. This uplink stream may be a newly established stream, or may be a stream that was previously assigned to a different group with a different Common PathlossReferenceRS. This is another exemplary action that may occur due to a change in the environment, and may be optional.

Figure 6:
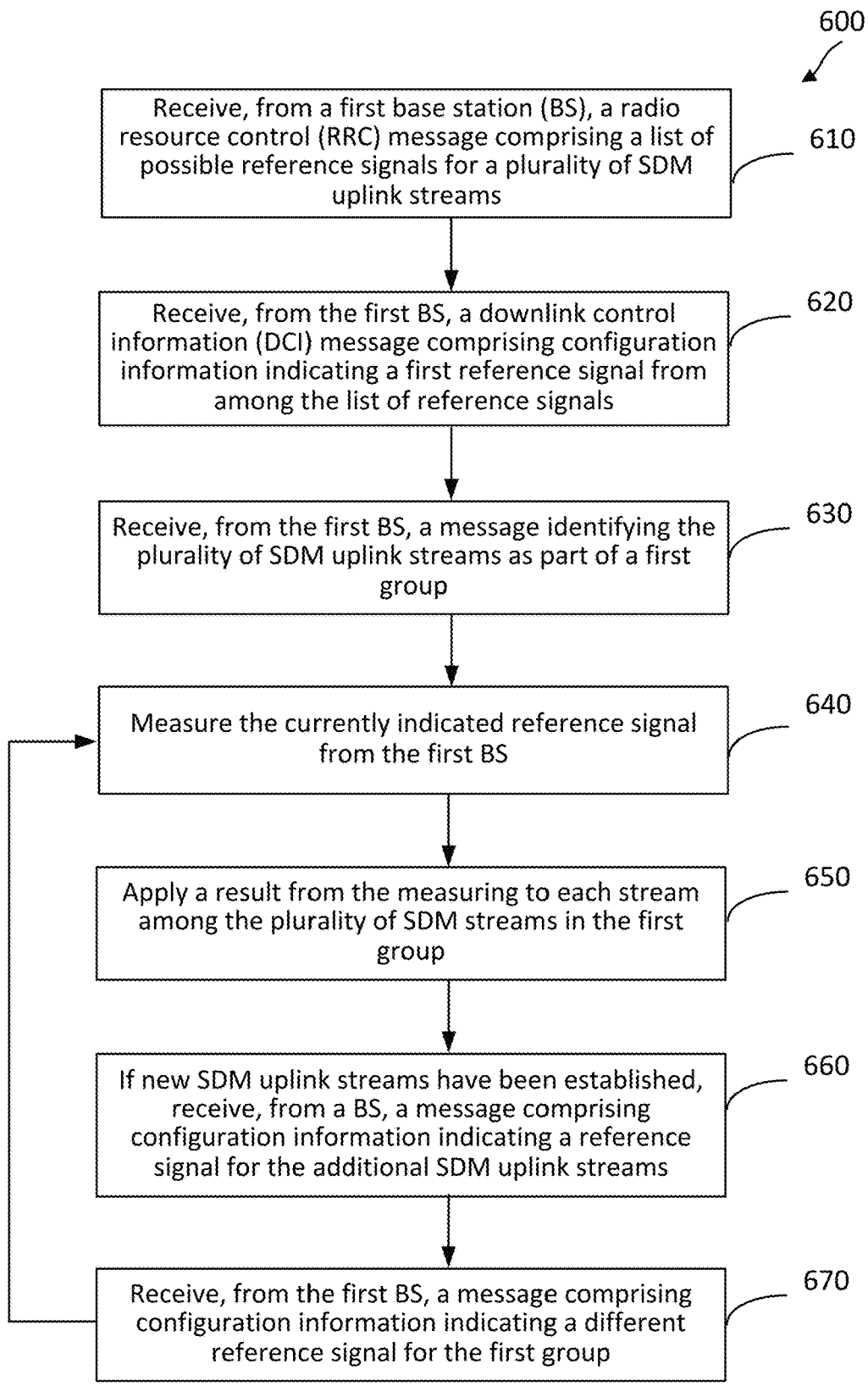
FIG. 6 illustrates an exemplary flow diagram of a wireless communication method according to some aspects of the present disclosure.

FIG. 6 is a flow diagram of a wireless communication method 600 according to some aspects of the present disclosure. Aspects of the method 600 can be executed by a computing device (e.g., a processor, processing circuit, and/or other suitable component) of a wireless communication device or other suitable means for performing the steps. For example, a wireless communication device, such as the UEs 115 and/or 400 may utilize one or more components, such as the processor 402, the memory 404, the reference signal configuration module 408, the transceiver 410, the modem 412, and the one or more antennas 416, to execute the steps of method 600. As illustrated, the method 600 includes a number of enumerated steps, but aspects of the method 600 may include additional steps before, after, and in between the enumerated steps. In some aspects, one or more of the enumerated steps may be omitted or performed in a different order.

At block 610, a UE 115 may receive, from a first BS, a message comprising a list of possible reference signals for a plurality of SDM uplink streams. This may be an RRC message, for example. As discussed above with reference to FIG. 5, such a message may be a singular message, or multiple messages which add and/or remove reference signals from the list one at a time or more than one at a time.

At block 620, the UE 115 may receive, from the first BS, a message with configuration information indicating a first reference signal from among the list of reference signals (e.g., a Common PathlossReferenceRS). In some aspects, the message may be a DCI message.

At block 630, the UE 115 may receive, from the first BS, a message identifying the plurality of SDM uplink streams as part of a first group. The creation of the first group may be by a single message, or a series of messages which may add and/or remove a stream to the group one at a time or more than one at a time. The group is associated with a Common PathlossReferenceRS which is to be used for each of the streams in the group. In order to configure a new PathlossReferenceRS, the first BS may send a single message indicating a new Common PathlossReferenceRS rather than a separate message for each individual stream in the group. In some aspects, the UE 115 may be configured with a structure which defines the Common PathlossReferenceRS, and the group of uplink streams is within that structure. Alternatively, the UE 115 may be configured with a structure that defines the group of SDM uplink streams, and the Common PathlossReferenceRS is included within that structure. Accordingly, the order of the configuration of the list of reference signals, indication of the Common PathlossReferenceRS, and the configuration of the groups of SDM uplink streams may occur in a variety of ways.

In some aspects, the first BS may configure a group of streams in action 630 without configuring a list of reference signals or indicating a PathlossReferenceRS as in actions 610 and 620. In that case, the UE 115 may assume a default PathlossReferenceRS for the streams in the defined group. If the first BS configures neither a PathlossReferenceRS nor a group of streams (as in action 630), the UE 115 may assume a respective default PathlossReferenceRS for each individual stream.

At block 640, the UE 115 may measure the currently indicated reference signal from the first BS. This is done so that the UE can get a coarse estimate of changes in the paths of the SDM uplink streams associates with the reference signal. While the individual beams will have variations between them, the indicated reference signal is intended to give a close enough indication to be used for coarse power adjustments among all the streams in the group.

At block 650, the UE 115 may apply a result from the measuring to each stream among the plurality of SDM streams in the first group for open loop power control of the SDM uplink streams (e.g., those streams transmitted from the same panel of the UE 115 to the same panel of the first BS).

At block 660, if there are any new SDM uplink streams that have been established, then the UE 115 may receive, from a BS, a message comprising configuration information indicating a reference signal for the additional SDM uplink streams. The BS may add the new SDM uplink streams to the existing first group of uplink streams, or to a separate group. If added to the first group, then the new streams will share the same Common PathlossReferenceRS. If added to a different group, then the new streams will have a separate Common PathlossReferenceRS. This configuration includes established the group of uplink streams, configuring a list of potential reference signals, which may be the same as the list of reference signals for the first group, and indicating which of the reference signals is to be used for coarse power adjustment. The BS in block 660 may be the same as the first BS, or could be a different BS. When the BS is a different BS, this is similar to the scenario illustrated in FIG. 2 which shows beams from a UE 115 to two different TRPs 205.

At block 670, the UE 115 may receive, from the first BS, a message comprising configuration information indicating a different reference signal for the first group. The BS may determine at various times that the reference signal used for measuring the path and performing a power adjustment on the uplink streams should change. It is not necessary, however, that this step be performed, as there may be no need for a change in the reference signal.

After block 670, the method 600 may repeat beginning at block 640, continuing to make reference signal measurements, and adjusting the power of the uplink streams associated with the measured reference signals.

Although not illustrated in FIG. 6, the above aspects related to method 600 may occur concurrently for multiple different panels between one or more BSs and the UE 115. For example, as illustrated in FIG. 2 the UE 115 may be connected to multiple TRPs at the same time, with multiple beams between each TRP and the UE 115. Moreover, each TRP-UE connection may include multiple streams via the same panels at the respective devices, such that aspects of the present disclosure may apply. Thus, one or more of the blocks 610-670 may occur at the same time, at overlapping times, and/or at different times for different groups of streams related to the different panel pairs between devices.

Figure 7:
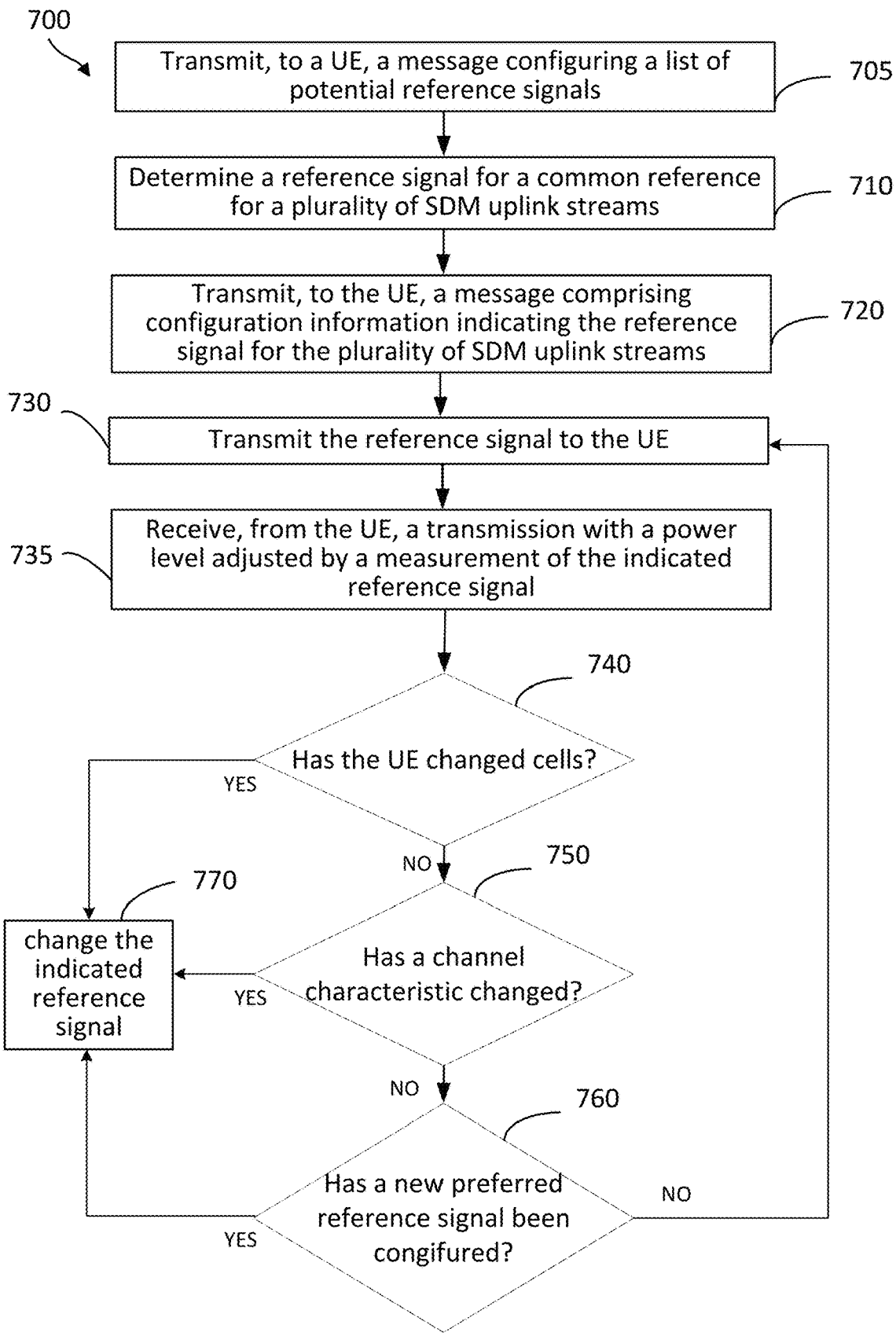
FIG. 7 illustrates an exemplary flow diagram of a wireless communication method according to some aspects of the present disclosure.

FIG. 7 is a flow diagram of a wireless communication method 700 according to some aspects of the present disclosure. Aspects of the method 700 can be executed by a computing device (e.g., a processor, processing circuit, and/or other suitable component) of a wireless communication device or other suitable means for performing the steps. For example, a wireless communication device, such as the BSs 105, the BS 300, and/or TRPs 205, may utilize one or more components, such as the processor 302, the memory 304, the reference signal configuration module 308, the transceiver 310, the modem 312, and the one or more antennas 316, to execute the steps of method 700. As illustrated, the method 700 includes a number of enumerated steps, but aspects of the method 700 may include additional steps before, after, and in between the enumerated steps. In some aspects, one or more of the enumerated steps may be omitted or performed in a different order.

At block 705, a BS 105 may transmit, to a UE 115, a message (e.g. an RRC message) configuring a list of potential reference signals. This may be performed as a single message, or as a series of messages. For example, the BS

105 may transmit a separate message adding one reference signal to the list at a time, and may send messages removing reference signals from the list as deemed appropriate by the BS 105. Further, the BS 105 may configure a group of uplink streams that are configured for the same reference signal.

At block 710, the BS 105 may determine a reference signal for a common reference for a plurality of SDM uplink streams. This may include, for example, determining what reference signal (e.g., what common PathlossReferenceRS) from among a list of reference signals possible for the UE to use (e.g., as configured at block 705 above. This determination may be based on a number of factors. Generally, the SDM uplink streams may utilize beam paths that are similar enough such that a measurement of the common reference signal gives meaningful information for all of them (for example, where the streams are via beams from the same panel of each device communicating with the other).

At block 720, the BS 105 may transmit, to the UE 115, a message that contains the configuration information indicating the reference signal for the plurality of SDM uplink streams as determined from block 715. This may be a single message, or a number of messages. For example, the message may include messages forming a group of SDM streams, forming a list of potential reference signals, and a parameter selecting which of the reference signals to use for a pathloss reference. This transmission may be part of a DCI message to the UE 115, for example.

At block 730, the BS 105 may transmit the reference signal to the UE 115. This transmission may occur on a regular basis, such that the UE 115 may measure changes in the reference signal measurements over time.

At block 735, the BS 105 may receive, from the UE 115, a transmission (such as a PUSCH transmission) with a power level adjusted by a measurement of the reference signal the BS 105 had transmitted to the UE 115 at block 730.

At decision block 740, if the BS 105 determines that the UE 115 has changed cells with which it is connected, then the method 700 proceeds to block 770 as discussed further below. Where the UE 115 is the entity that makes the determination, decision block 740 would instead determine if a notification is received by the BS 105 from the UE 115 identifying that determination. If there is no change in cells, the method proceeds to decision block 750.

At decision block 750, if the BS 105 determines that a channel characteristic has changed, the method 700 proceeds to block 770. Where the UE 115 is the entity that makes the determination, decision block 750 would instead determine if a notification is received by the BS 105 from the UE 115 identifying that determination. Either way, the change in channel characteristic may be due to changes in reflection sources, scattering sources, atmospheric conditions, or a variety of other factors. If a characteristic has changed such that the currently indicated reference signal is no longer satisfactory, then the method proceeds to block 770 as described below. Otherwise, the method proceeds to decision block 760.

At decision block 760, a determination may be made, by the BS 105, such as on its own or as prompted by a request from the UE 115, that a new preferred reference signal has been configured. For example, a BS 105 may begin with a SSB reference signal used for the Common PathlossReferenceRS, but may later configure a CSI-RS reference signal which is preferred (or vice-versa). If there is a new preferred reference signal, then the method proceeds to block 770 as described below, otherwise it proceeds to block 730. The BS 105 may continue to transmit the reference signal, receive data from the UE 115 at adjusted power levels, and monitor for conditions that would require a change in any of the configurations, including adding and removing reference signals from the list, indicating a new PathlossReferenceRS as discussed below with reference to block 770, configuring new SDM uplink streams, or re-grouping the streams to name a few examples.

At block 770, the BS 105 may configure the UE 115 to use a different reference signal (again, a common reference signal, such as a common PathlossReferenceRS, for multiple streams sharing a panel between devices). This may be done in some aspects by simply changing the indicated Common PathlossReferenceRS using a single message, such as a DCI message identifying a different reference signal from a list. In other examples, the change may include also changing which SDM uplink streams are grouped together, and/or which reference signals are included in the list of potential reference signals. Upon making the change, the method 700 may proceed from block 770 back to the appropriate block, such as block 705 if the list of reference signals is changed, or block 720 if changing just which reference signal is selected from the list, and proceed as further discussed above.

Further aspects of the present disclosure include the following:

1. A method of wireless communication comprising:
receiving, by a first wireless communications device from a second wireless communications device, a message comprising configuration information indicating a reference signal for a plurality of spatial domain multiplexing (SDM) uplink streams;
measuring, by the first wireless communications device, the reference signal from the second wireless communications device; and
applying, by the first wireless communications device, a result from the measuring to each stream among the plurality of SDM uplink streams.

2. The method of aspect 1, wherein the plurality of SDM uplink streams are between a panel of the first wireless communications device and a panel of the second wireless communications device.

3. The method of any of aspects 1-2, further comprising:
receiving, by the first wireless communications device from the second wireless communications device, a first message comprising a list of possible reference signals for the plurality of SDM uplink streams, the message comprising a second message and the configuration information comprising an indication of the reference signal from among the list of reference signals.

4. The method of any of aspects 1-2, wherein the message comprises a first message, the method further comprising:
receiving, by the first wireless communications device from the second wireless communications device, a second message identifying the plurality of SDM uplink streams as part of a first group.

5. The method of aspect 4, wherein the reference signal comprises a first reference signal, the method further comprising:
receiving, by the first wireless communications device from a third wireless communications device, a third message comprising configuration information indicating a second reference signal for one or more additional SDM uplink streams, the first and second reference signals being different and the one or more additional SDM uplink streams are identified as part of a second group.

6. The method of aspect 5, wherein the third wireless communications device is different than the second wireless communications device.

7. The method of any of aspects 1-6, wherein the applying comprises:
performing a coarse power adjustment to the plurality of SDM uplink streams.

8. A method of wireless communication comprising:
determining, by a first wireless communications device, a common reference signal for a plurality of spatial domain multiplexing (SDM) uplink streams;
transmitting, by the first wireless communications device to a second wireless communications device, a message comprising configuration information indicating the reference signal; and
transmitting, by the first wireless communications device to the second wireless communications device, the reference signal.

9. The method of aspect 8, wherein the plurality of SDM uplink streams are between a panel of the first wireless communications device and a panel of the second wireless communications device.

10. The method of any of aspects 8-9, further comprising:
transmitting, by the first wireless communications device to the second wireless communications device, a first message comprising a list of possible reference signals for the plurality of SDM uplink streams, the message comprising a second message and the configuration information comprising an indication of the reference signal from among the list of reference signals.

11. The method of aspect any of aspects 8-9, wherein the message comprises a first message, the method further comprising:
transmitting, by the first wireless communications device to the second wireless communications device, a second message identifying the plurality of SDM uplink streams as part of a first group.

12. The method of any of aspects 8-9, wherein the message comprises a first message, the method further comprising:
receiving, by the first wireless communications device from the second wireless communications device, a second message comprising configuration information indicating a different reference signal for the plurality of SDM uplink streams.

13. The method of aspect 12, wherein the reference signal comprises a synchronization signal block (SSB), and the different reference signal comprises a channel state information reference signal (CSI-RS), the method further comprising:
changing the reference signal used as the reference signal for the plurality of SDM uplink streams to the different reference signal.

14. The method of aspect 12, wherein the second message is sent in response to a change in a characteristic of a channel associated with one of the plurality of SDM uplink streams.

15. The method of any of aspects 8-14, wherein the applying comprises:
performing a coarse power adjustment to the plurality of SDM uplink streams.

16. A first wireless communications device comprising:
a transceiver configured to:
receive, from a second wireless communications device, a message comprising configuration information indicating a reference signal for a plurality of spatial domain multiplexing (SDM) uplink streams;
measure the reference signal from the second wireless communications device; and a processor configured to:
apply a result from the measuring to each stream among the plurality of SDM uplink streams.

17. The first wireless communications device of aspect 16, wherein the plurality of SDM uplink streams are between a panel of the first wireless communications device and a panel of the second wireless communications device.

18. The first wireless communications device of any of aspects 16-17, the transceiver further configured to:
receive, from the second wireless communications device, a first message comprising a list of possible reference signals for the plurality of SDM uplink streams, the message comprising a second message and the configuration information comprising an indication of the reference signal from among the list of reference signals.

19. The first wireless communications device of any of aspects 16-17, wherein the message comprises a first message, the transceiver further configured to:
receive, from the second wireless communications device, a second message identifying the plurality of SDM uplink streams as part of a first group.

20. The first wireless communications device of aspect 19, wherein the reference signal comprises a first reference signal, the transceiver further configured to:
receive, from a third wireless communications device, a third message comprising configuration information indicating a second reference signal for one or more additional SDM uplink streams, the first and second reference signals being different and the one or more additional SDM uplink streams are identified as part of a second group.

21. The first wireless communications device of aspect 20, wherein the third wireless communications device is different than the second wireless communications device.

22. The first wireless communications device of any of aspects 16-21, wherein the applying comprises:
performing a coarse power adjustment to the plurality of SDM uplink streams.

23. A first wireless communications device comprising:
a processor configured to:
determine a common reference signal for a plurality of spatial domain multiplexing (SDM) uplink streams; and
a transceiver configured to:
transmit, to a second wireless communications device, a message comprising configuration information indicating the reference signal; and
transmit, to the second wireless communications device, the reference signal.

24. The first wireless communications device of aspect 23, wherein the plurality of SDM uplink streams are between a panel of the first wireless communications device and a panel of the second wireless communications device.

25. The first wireless communications device of any of aspects 23-24, the transceiver further configured to:
transmit, to the second wireless communications device, a first message comprising a list of possible reference signals for the plurality of SDM uplink streams, the message comprising a second message and the configuration information comprising an indication of the reference signal from among the list of reference signals.

26. The first wireless communications device of any of aspects 23-24, wherein the message comprises a first message, the transceiver further configured to:
transmit, to the second wireless communications device, a second message identifying the plurality of SDM uplink streams as part of a first group.

27. The first wireless communications device of any of aspects 23-24, wherein the message comprises a first message, the transceiver further configured to:
receive, from the second wireless communications device, a second message comprising configuration information indicating a different reference signal for the plurality of SDM uplink streams.

28. The first wireless communications device of aspect 27, wherein the reference signal comprises a synchronization signal block (SSB), and the different reference signal comprises a channel state information reference signal (CSI-RS), the processor further configured to:
change the reference signal used as the reference signal for the plurality of SDM uplink streams to the different reference signal.

29. The first wireless communications device of aspect 27, wherein the second message is sent in response to a change in a characteristic of a channel associated with one of the plurality of SDM uplink streams.

30. The first wireless communications device of any of aspects 23-29, wherein the applying comprises:
performing a coarse power adjustment to the plurality of SDM uplink streams.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication comprising:
receiving, by a first wireless communications device from a second wireless communications device, a message comprising configuration information indicating a single reference signal for a plurality of spatial domain multiplexing (SDM) uplink streams associated with respective different beam directions;
measuring, by the first wireless communications device, the single reference signal from the second wireless communications device; and
applying, by the first wireless communications device, a result from the measuring to each stream among the plurality of SDM uplink streams.

2. The method of claim 1, wherein the plurality of SDM uplink streams are between a panel of the first wireless communications device and a panel of the second wireless communications device.

3. The method of claim 1, further comprising:
receiving, by the first wireless communications device from the second wireless communications device, a first message comprising a list of possible reference signals for the plurality of SDM uplink streams, the message comprising a second message and the configuration information comprising an indication of the single reference signal from among the list of reference signals.

4. The method of claim 1, wherein the message comprises a first message, the method further comprising:
receiving, by the first wireless communications device from the second wireless communications device, a second message identifying the plurality of SDM uplink streams as part of a first group.

5. The method of claim 4, wherein the single reference signal comprises a first reference signal, the method further comprising:
receiving, by the first wireless communications device from a third wireless communications device, a third message comprising configuration information indicating a second reference signal for one or more additional SDM uplink streams, the first and second reference signals being different and the one or more additional SDM uplink streams being identified as part of a second group.

6. The method of claim 5, wherein the third wireless communications device is different than the second wireless communications device.

7. The method of claim 1, wherein the applying comprises:
performing a coarse power adjustment to the plurality of SDM uplink streams.

8. A first wireless communications device comprising:
a transceiver configured to:
receive, from a second wireless communications device, a message comprising configuration information indicating a single reference signal for a plurality of spatial domain multiplexing (SDM) uplink streams associated with respective different beam directions;

measure the single reference signal from the second wireless communications device; and a processor configured to apply a result from the measuring to each stream among the plurality of SDM uplink streams.

9. The first wireless communications device of claim 8, wherein the plurality of SDM uplink streams are between a panel of the first wireless communications device and a panel of the second wireless communications device.

10. The first wireless communications device of claim 8, the transceiver further configured to:

receive, from the second wireless communications device, a first message comprising a list of possible reference signals for the plurality of SDM uplink streams, the message comprising a second message and the configuration information comprising an indication of the single reference signal from among the list of reference signals.

11. The first wireless communications device of claim 8, wherein the message comprises a first message, the transceiver further configured to:

receive, from the second wireless communications device, a second message identifying the plurality of SDM uplink streams as part of a first group.

12. The first wireless communications device of claim 11, wherein the single reference signal comprises a first reference signal, the transceiver further configured to:

receive, from a third wireless communications device, a third message comprising configuration information indicating a second reference signal for one or more additional SDM uplink streams, the first and second reference signals being different and the one or more additional SDM uplink streams being identified as part of a second group.

13. The first wireless communications device of claim 12, wherein the third wireless communications device is different than the second wireless communications device.

14. The first wireless communications device of claim 8, wherein the applying comprises:

performing a coarse power adjustment to the plurality of SDM uplink streams.

\* \* \* \* \*